United States Patent [19]

Bernard et al.

[11] 4,225,754

[45] Sep. 30, 1980

[54] LOUDSPEAKER TELEPHONE

[75] Inventors: Solange Bernard, Bruyeres le Chatel; Dominique Lajotte, Ris Orangis; Francois Michelon, Bretigny sur Orge; Jacques Sourgens, Massy, all of France

[73] Assignee: Compagnie Industrielle des Telecommunications Cit-Alcatel, Paris, France

[21] Appl. No.: 961,176

[22] Filed: Nov. 16, 1978

[30] Foreign Application Priority Data

Dec. 14, 1977 [FR] France .............................. 77 37650

[51] Int. Cl.² .......................................... H04M 1/60
[52] U.S. Cl. ............................... 179/81 B; 179/1 HF
[58] Field of Search ............... 179/1 HF, 81 A, 81 B, 179/170.2, 170.6, 170.8; 333/70 T

[56] References Cited

U.S. PATENT DOCUMENTS

| | | | |
|---|---|---|---|
| 4,007,341 | 2/1977 | Sourgens et al. | 179/170.2 |
| 4,024,357 | 5/1977 | Sourgens et al. | 179/170.2 |
| 4,057,696 | 11/1977 | Gitlin et al. | 179/170.2 |

*Primary Examiner*—John H. Wolff
*Assistant Examiner*—Joseph A. Popek
*Attorney, Agent, or Firm*—Sughrue, Rothwell, Mion, Zinn and Macpeak

[57] ABSTRACT

A loudspeaking telephone has a differential coupler (3) connecting a two-way two-wire telephone line (4) to separate transmission and reception channels (1 and 2 respectively) including respectively a microphone (5) and a loudspeaker (7). A first transversal filter (10) synthesizes an acoustic echo signal $y_a$ which is subtracted from the microphone signal to deliver a substantially echo-free signal to the transmission channel. Likewise a second transversal filter (11) synthesizes an electrical echo signal to deliver a substantially echo-free signal to the reception channel.

11 Claims, 3 Drawing Figures

LOUDSPEAKER TELEPHONE

FIELD OF THE INVENTION

The present invention concerns telephone connections using telephone lines of the public switched network. It is particularly concerned with loudspeaking telephones, which are also known as "hands-free" telephones.

BACKGROUND OF THE INVENTION

As is well known, a loudspeaking telephone comprises a transmission channel incorporating a high-gain amplifier connecting the microphone to a two-wire subscriber line, and a reception channel incorporating a high-gain amplifier connecting the subscriber line to the loudspeaker. A differential coupler is used to connect the transmission and reception channels to the subscriber line, and, in theory, this prevents all leakage between the transmission and reception channels. However, as the matching of the differential coupler is necessarily less than perfect, the transmission signals break through into the reception channel, and this results in an electrical echo signal being present in the reception channel.

In addition to the electrical coupling between the transmission and reception channels at the differential coupler which connects these two channels to the subscriber line, there is also acoustic coupling between the loudspeaker and the microphone. The sound waves emitted by the loudspeaker impinge on the microphone, whether by virtue of direct or indirect acoustic coupling, in other words whether the sound waves are reflected by obstacles in the surrounding area or not. An acoustic echo signal is produced at the microphone. These echo signals generate self-oscillations which produce howling noises (the Larsen effect) which make telephone conversation difficult if not impossible.

To overcome the Larsen effect, there have been various methods proposed for isolating the transmission and reception channels from one another during a conversation, in other words to make one of the channels inactive during the operation of the other. One of the best known of these methods consists in introducing a certain level of attenuation into the transmission channel or the reception channel, depending on whether the distant or local end subscriber is speaking. This method uses so-called "voice-operated gain adjusting devices" to operate the equipment in alternating mode, in other words in transmission or in reception.

The use of such devices has certain disadvantages, however. If the operating mode switchover function operates at high-speed, the conversation becomes unpleasant, speech being cut up into separate syllables and brief noises resulting in unnecessary switching operations. If the operating mode switching is too slow, however, there is a risk that the first one or more syllables of a reply will be lost, and it is not possible for the other party to break in, the reception channel of the speaking party being rendered totally inactive.

The aim of the present invention is to attenuate the echo signals in order to eliminate the Larsen effect whilst avoiding chopping of the speech signals and making it possible for the listening party to interrupt the speaking party, in other words permitting the two parties to communicate in a natural manner.

SUMMARY OF THE INVENTION

The present invention provides a loudspeaking telephone comprising:

a differential coupler for connection to a two-wire telephone line and including an input and an output;

a microphone circuit having its output connected to the input of a transmission channel whose output is connected to the input of the differential coupler;

a loudspeaker circuit having its input connected to the output of a reception channel whose input is connected to the output of the differential coupler; and first and second adaptive transversal filter means associated respectively with the transmission channel and with the reception channel;

both of the adaptive transversal filter means having controlled weighting and filter coefficients, and including:

a signal combining circuit;

a signal input connected to receive the output signal of the associated channel;

a signal output connected to deliver a filter output signal to the signal combining circuit;

the signal combining circuit being connected in series with the other channel to receive the input signal of the other channel, to combine it with the filter output signal and to apply the combined signal to the remainder of the said other channel; and a control input for controlling the coefficients connected to receive the combined signal;

the arrangement being such that, in operation, the first adaptive transversal filter means uses the output signal of the reception channel to synthesise any acoustic echo signal component present in the output from the microphone circuit, and its combining circuit subtracts the real and the synthetic acoustic echo signal components from each other to reduce the acoustic echo signal component in the transmission channel to a residual level; and likewise the second adaptive transversal filter means uses the output signal of the transmission channel to synthesise any electrical echo signal component present in the output from the differential coupler, and its combining circuit subtracts the real and the synthetic electrical echo signal components from each other to reduce the electrical echo signal component in the reception channel to a residual level.

The transmission and reception channels may each comprise a respective delay circuit connected between the output of the signal combining circuit associated with one of the transversal filters and the signal input of the other transversal filter, said delay circuit delaying the signal in the channel in question before its entry to the transversal filter signal input by a period at least equal to the active period of the impulse response synthesised by the transversal filter.

Both transversal filter means may be embodied by a single filter circuit operating on a time-sharing basis.

Other characteristics and advantages of the present invention will emerge from the following description which is given with reference to the accompanying drawings.

DESCRIPTION OF THE PREFERRED EMBODIMENT

Figure 1:
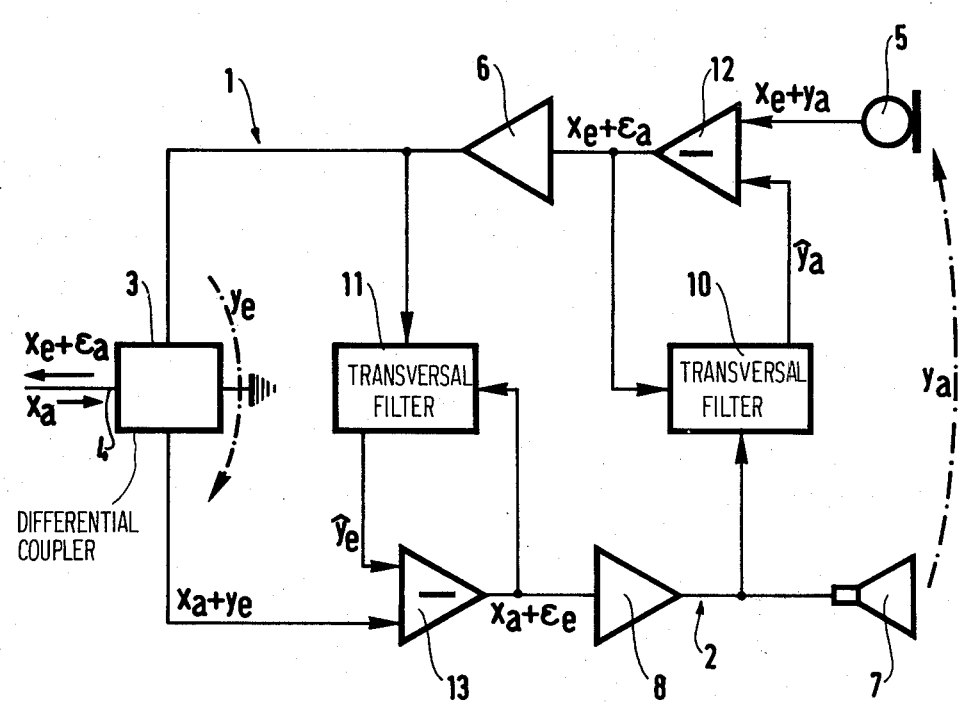
FIG. 1 shows a loudspeaking telephone in accordance with the invention.

FIG. 1 shows a loudspeaking telephone in accordance with the invention. The telephone comprises a transmission channel 1, a reception channel 2, and a differential coupler 3 providing the electrical connection of the two channels to a two-wire, two-way subscriber telephone line 4. The transmission channel incorporates a microphone 5 and an amplifier 6 connected to the differential coupler 3. The reception channel comprises a loudspeaker 7 connected to an amplifier 8. The differential coupler 3 routes the telephone signal generated by the microphone and amplified by the amplifier 6 towards the line 4 and the telephone signal received from the line 4 towards the amplifier 8 and the loudspeaker 7.

To eliminate interaction between the two channels due to electrical coupling of the channels at the differential coupler and acoustical coupling between the microphone and the loudspeaker, the telephone further comprises two transversal filters 10 and 11, each with controlled weighting and filter coefficients and associated with a respective subtractor circuit 12 or 13.

The transversal filter 10 synthesises the transfer function of the acoustic echo path. Its input is connected to the reception channel between the loudspeaker 7 and the amplifier 8. It is associated with the subtractor circuit 12, which is connected into the transmission channel between the microphone 5 and the amplifier 6. The output of the filter 10 supplies to the subtractor 12 the synthesised echo signal $y_a$ of the acoustic coupling loop between the loudspeaker and the microphone. The error signal used to produce convergence of the weighting and filter coefficients is taken from the output of subtractor 12.

The transversal filter 11 synthesises the transfer function of the electrical echo path. Its input is connected to the transmission channel between the amplifier 6 and the differential coupler 3. It is associated with the subtractor circuit 13 which is connected into the reception channel between the differential coupler 3 and the amplifier 8. The output of the filter 11 supplies the synthesised echo signal $y_e$ of the electrical coupling loop at the differential coupler. The error signal used to produce convergence of the weighting and filter coefficients is taken at the output of subtractor 13.

The operation of controlled coefficient transversal filters is well known, and results in the coefficients converging towards the values of the impulse response to be synthesised by virtue of the correlation between the input signal to the transversal filter and the error signal applied to the filter. Thus the transversal filter 10 synthesises the acoustic echo signal which is the only one correlated with the input signal. The transversal filter 11 synthesises its electric echo signal, which is the only signal correlated with its input signal. The echo signal synthesised by each transversal filter is subtracted from the real echo signal in order to attenuate it, the residual echo signal being at a low level and avoiding the Larsen effect.

To more clearly demonstrate the operation of the telephone in accordance with the invention, FIG. 1 shows the various signals obtained upstream and downstream of each subtractor, namely:

$x_e$: the transmitted signal from which the electric echo signal $y_e$ is generated as a result of the electrical coupling between the transmission and reception channels, and $x_a$: the signal received on the reception channel from which the acoustic echo signal $y_a$ is generated as a result of the acoustic coupling between the loudspeaker and the microphone.

The echo signals are superimposed on the transmitted and received signals. These echo signals are attenuated: the subtractor 12 substitutes for the input signal to the transmission channel $(x_e+y_a)$ the signal $x_e+\epsilon_a$ where $\epsilon_a$ is the residual acoustic echo signal: $\epsilon_a=y_a-\hat{y}_a$. In a similar manner, the subtractor 13 substitutes for the input signal to the reception channel $(x_a+y_e)$ the signal $x_a+\epsilon_e$, where $\epsilon_e$ is the residual electrical echo signal: $\epsilon_e=y_e-\hat{y}_e$.

Figure 2:
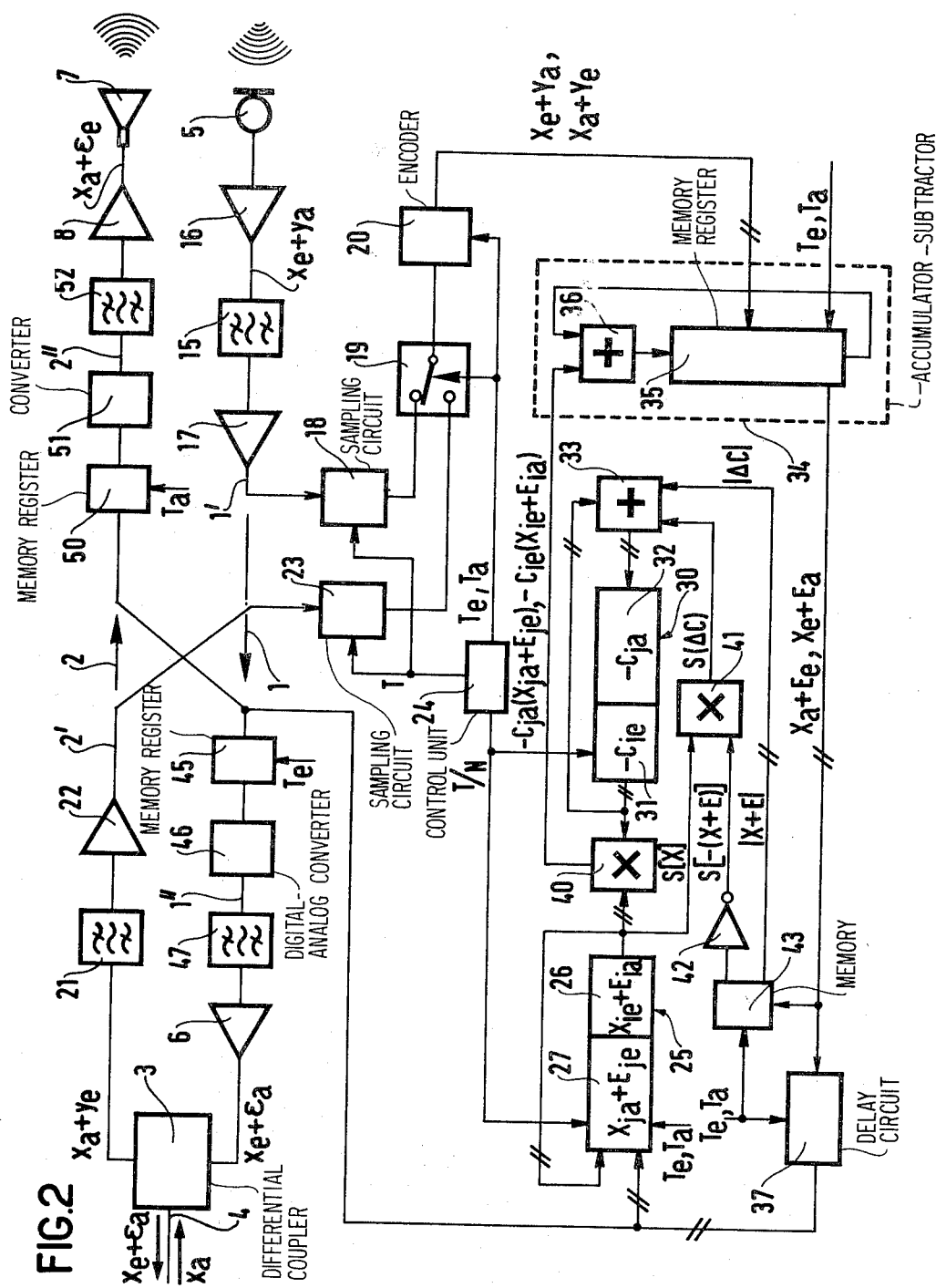
FIG. 2 shows a particular embodiment of the telephone in accordance with the invention.

FIG. 2 shows a preferred embodiment of the telephone in accordance with the invention, in which the various circuits used to attenuate the echo signals are digital circuits. FIG. 2 uses the same reference numerals for components or circuits which are identical to those of FIG. 1. The reference numerals 1' and 2' are used for those parts of the transmission and reception channels, respectively, carrying the echo signal $y_a$ or $y_e$ superimposed on the transmitted or received signal $x_e$ or $x_a$. Reference numerals 1" and 2" are used for those parts of the transmission and reception channels, respectively, carrying only the residual echo signal $\epsilon_a$ or $\epsilon_e$ superimposed on the transmitted or received signal $x_e$ or $x_a$. The arrows between the two parts of each channel are a symbolic representation of the total transmission or reception channel, and are therefore marked with reference numerals 1 and 2.

The signal obtained at the output from the microphone is passed through a bandpass filter 15 with a passband extending from 300 to 3400 Hz, this signal being amplified in a preamplifier 16 and an amplifier 17 connected respectively upstream and downstream of the filter 15. These circuits control the transmission level of this signal. The transmission channel signal is sampled at a period T of 125 $\mu$s. To this end, the output of the amplifier 17, which is also that of part 1' of the transmission channel, is connected to a sampling circuit 18, which is connected through an analogue multiplexer 19, shown in symbolic form as a two-position switch, to an analogue to digital converter or encoder 20. The encoded samples obtained from section 1' of the transmission channel and converter 20 are generally referenced $X_e+Y_a$, $X_e$ corresponding to the signal $x_e$ and $Y_a$ corresponding to the echo signal $y_a$.

The telephone signal at the input to the reception channel, in other words at the output of the differential coupler 3, is also passed through a bandpass filter 21 with a passband extending from 300 to 3400 Hz, and through an amplifier 22 which controls its reception level. The signal obtained from section 2' of the reception channel is also sampled at the period T of 125 $\mu$s. To this end, the output of the amplifier 22 is connected to a sampling circuit 23 which is connected through the analogue multiplexer 19 to the encoder 20. The encoded samples obtained from section 2' of the reception channel and the encoder 20 are generally referenced $X_a+Y_e$, where $X_a$ corresponds to the signal $x_a$ and $Y_e$ corresponds to the echo signal $y_e$.

A control unit 24 operating on a time sharing basis outputs various clock signals, including a clock signal with the period T, and clock signals defining two cycles $T_e$ and $T_a$ within each period T. The control unit 24 controls the two sampling circuits 18 and 23 simultaneously during each period T, controlling the operation of the multiplexer circuit 19 to route the samples obtained to the encoder at the start of cycles $T_e$ and $T_a$ in each period T. The control unit is also used to process the received and transmitted signals which generate the echo signals which it is required to attenuate.

In the embodiment shown in FIG. 2, the two digital transversal filters with controlled weighting and filter coefficients are embodied in a single filter circuit which is used to synthesise the acoustic echo signal $y_a$ present on section 1' of the transmission channel and the electric echo signal $y_e$ present on section 2' of the reception channel. In the remainder of this description, the notation $X_e + Y_a$ is retained for the transmission signal sample derived from the microphone output and the notation $X_a + Y_e$ is used for the received signal sample obtained from the differential coupler 3. If either of the signals $x_e$ and $x_a$ is absent, the corresponding samples are obviously nonexistent. Thus if $x_a$ is absent, samples $X_a$, $Y_a$ and $E_a$ are all zero. Likewise, if $x_e$ is absent, samples $X_e$, $Y_e$ and $E_e$ are all zero, $E_a$ and $E_e$ designating the samples of the residual echo signals $\epsilon_a$ and $\epsilon_e$, $Y_a$ and $Y_e$ being the echo signal samples.

The single filter circuit incorporates a first delay line 25 acting on the samples $X_e + E_a$ and $X_a + E_e$ of the transmitted and received signals to be processed which generate the echo signals which are sampled as $Y_e$ and $Y_a$. It also incorporates a second delay line 30 acting on the weighting and filter coefficients which synthesise the impulse response, with inverted phase, of the electric echo path and the impulse response, with inverted phase, of the acoustic echo path. These coefficients are generally designated $C_e$ and $C_a$.

Each of the two delay lines 25 and 30 comprises a shift register with N cells or stages. In each of the delay lines 25 and 30 the N stages are divided into two groups, as shown in the diagram by the line dividing the delay line into two parts. These two parts are referenced 26 and 27 for line 25 and 31 and 32 for line 30. The first part 26 or 31, in other words the first set of stages, comprises n stages, for processing n samples $X_{ie} + E_{ia}$ ($1 \leq i \leq n$) of the transmission channel signal and generating an electrical echo signal with n weighting and filter coefficients $-C_{ie}$ for synthesising samples of the impulse response, with inverted phase, of the electric echo path.

The second part 27 or 32, or in other words the second set of stages, comprises m stages (n+m=N) for processing m samples $X_{ja} = E_{je}$ ($1 \leq j \leq m$) of the reception channel signal and generating an acoustic echo signal with m weighting and filter coefficients $-C_{ja}$ for synthesising samples of the impulse response, with reverse phase, of the acoustic echo path.

Each of delay lines 25 and 30 has 128 stages (N=128). The first part 26 or 31 comprises 46 stages (n=46). The second part 27 or 32 comprises the remaining 82 stages (m=82).

The encoded samples of the transmitted and received signals and the echo signals, $X_e + Y_a$ and $X_a + Y_e$, supplied by the encoder 20 are applied to one input of an accumulator-subtractor 34 consisting in this instance of a memory register 35 and a summing circuit 36, the output of the memory being looped to its input through the summing circuit. As will be explained below, this accumulator-subtractor 34 constitutes the subtractor associated with each of the transversal filters which, during each period T, substitutes for the echo signal samples $Y_a$ and $Y_e$ the residual echo signal samples $E_a$ and $E_e$. The unload output of the accumulator-subtractor 34 supplies the signal samples $X_e + E_a$ and $X_a + E_e$ applied to the input of each transversal filter, and is connected through a delay circuit 37 to the load input of the delay line 25, to update the contents of this delay line at the beginning of each of the cycles $T_e$ and $T_a$ in each period T.

The delay introduced by the delay circuit 37 is a multiple of the period T, and is at least equal to the greater of the periods nT and mT. In this instance, the delay is NT. The function of the delay circuit 37 is to delay the filter input signals by the time required for rejection, outside of the impulse response of the electric echo path and the impulse response of the acoustic echo path synthesised by the filters, of all disturbing effects due, for example at the electric loop level, to the presence of a residual acoustic echo signal sample $E_a$ in the filter input signal and the presence of a received signal sample $X_a$ in the filter coefficient control signal. In this case, the samples $E_a$ and $X_a$ may be correlated in those parts of the filter circuit which synthesise the impulse response of the electric echo path, with inverted phase, and are therefore shifted relative to one another in order to dissociate them. The same may apply in those parts of the filter circuit which synthesise the impulse response, with inverted phase, of the acoustic echo path: samples $E_e$ and $X_e$ may be correlated and disturb the impulse response of the corresponding part of the filter circuit, and are therefore dissociated by means of a relative shift. It is this delay NT which dissociates the samples which must not be correlated.

The delay line 25 is also looped upon itself, in that its output is connected to a recycle input to enable complete recycling of the stored samples during each period T of 125μs, under the control of the time sharing control unit 24. The clock signal controlling the recycling of these samples is T/N.

The delay line 30 is also looped upon itself through a correction circuit 33 in the form of an adder which corrects the weighting and filter coefficients stored in the delay line 30. The output of the delay line 30 is therefore connected to an input of the adder 33, the output of which is connected to the input of the line 30. Under the control of the signal T/N supplied by the control unit 24, the coefficients are corrected and circulate in the delay line 30. These coefficients are completely recycled during each period T.

Note that for the delay line 25 the recycle and load inputs have been deliberately separated, in order to clearly show the two corresponding functions.

In the delay lines 25 and 30, to the n last but one samples $X_{ie} + E_{ia}$ generated by the accumulator-subtractor 34 and stored in section 26 there correspond the n coefficients $-C_{ie}$ in section 31, whereas to the m last but one samples $X_{ja} + E_{je}$ generated by the accumulator-subtractor and stored in section 27 there correspond the m coefficients $-C_{ja}$ in section 32, the final sample $X_{(n+1)e} + E_{(n+1)a}$ and the final sample $X_{(m+1)a} + E_{(m+1)e}$ generated by the accumulator-subtractor 34 being temporarily located in circuit 37, which delays them by a period NT.

In the single filter circuit, a multiplier circuit 40 connected to the output of the delay line 25 and to the output of the delay line 30 generates, in each period T, the products $-C_{ie}(X_{ie} + E_{ia})$ and the products $-C_{ja}(X_{ja} + E_{je})$. These products are applied to a second input of the adder 36 which cooperates with the memory register 35 to generate, during each period T, the sums of the products formed with the encoded samples applied to the memory register 35, in other words:

$$X_a + Y_e + \sum_{i=1}^{i=n} - C_{ie}(X_{ie} + E_{ia}) \text{ and}$$

$$X_e + Y_a + \sum_{j=1}^{j=m} - C_{ja}(X_{ja} + E_{ja})$$

These two sums give the new samples of the transmitted and received signals accompanied by the residual echo signal samples, $X_{(n+2)e}+E_{(n+2)a}$ and $X_{(m+2)a}+E_{(m+2)e}$ which are applied to the delay circuit 37, whereas the samples $X_{(n+1)e}+E_{(n+1)a}$ and $X_{(m+1)a}+E_{(m+1)e}$ generated during the previous period T and delayed by circuit 37 are applied to the delay line 25, to update its contents.

In the filter circuit, the adjustment of the coefficients $-C_{ie}$ and $-C_{ja}$ is controlled by the correlation of the sample provided by the accumulator-subtractor 34, consisting of the residual echo signal sample $E_e$ or $E_a$, possibly associated with the sample $X_a$ or $X_e$, with the sample of the signal which generates this echo. For this purpose, the filter circuit comprises a multiplier 41 connected to the output of the delay line 25 and, via an inverter 42, to a phase correction memory 43. The memory 43 is connected to the unload output of the accumulator-subtractor 34 which operates as a delay circuit to delay each of the samples received from the accumulator-subtractor 34 by the duration of the cycle $T_e$ or $T_a$ following its generation; it is loaded at the start of each of the two cycles $T_e$ and $T_a$ in each period T. The multiplier 41 receives only the signs of the samples output by the delay line 25 and the memory 43, this sign data being represented S[X] and S[$-(X+E)$] in FIG. 2, for the sake of simplification. The multiplier may advantageously consist of an exclusive-OR logic gate. The correlation product of these signs gives the direction in which the coefficients $-C_{ie}$ and $-C_{ja}$ must be modified. The modulus of the correction applied to the coeffients $-C_{ie}$ and $-C_{ja}$ is a function of the sample provided by the accumulator-subtractor 34. For simplicity, the modulus of this correction is indicated $|\Delta C|$ in FIG. 2. In reality, this modulus is $|\Delta C_e|$ or $|\Delta C_a|$, depending on whether coefficient $C_{ie}$ or $C_{ja}$ is involved, the sign of the correction being designated $S(\Delta C)$.

The modulus of the correction $|\Delta C|$ of coefficients $C_{ie}$ and $C_{ja}$ may be directly related to the value of the sample obtained from the memory 43 connected to the output of the accumulator-subtractor 34, as shown in FIG. 2. Alternatively, the modulus of the correction $|\Delta C|$ may be defined by the modulus of the sample provided by the memory after a high level of attenuation; this would be the case, for example, on detection of the simultaneous presence of signals $x_e$ and $x_a$ on the transmission and reception channels.

The samples $X_a+E_e$ and $X_e+E_a$ generated by the accumulator-subtractor 34 and obtained at the output of the delay circuit 37 are reinserted into sections 2" and 1" of the reception and transmission channels. For this purpose, the output of the delay circuit 37 is connected to a memory register 45 which is loaded at the beginning of cycle $T_e$ in each period T with the samples $X_e+E_a$. This register 45 is connected to a digital-analogue converter 46 which injects the analogue signal $x_e+\epsilon_a$ into section 1" of the transmission channel. This signal is passed through a bandpass filter 47 with a passband extending from 300 to 3400 Hz, connected to the digital-analogue converter 46, and is then amplified in the channel amplifier 6 connected between the filter 47 and the differential coupler 3.

In a similar manner, the samples $X_a+E_e$ are reinserted in section 2" of the reception channel, after conversion. The output of the delay circuit 37 is also connected to a memory register 50 which is loaded at the start of cycle $T_a$ in each period T. The register 50 is connected to a digital-analogue converter 51 which supplies the analogue signal $x_a+\epsilon_e$ to section 2" of the reception channel. A bandpass filter 52 with a passband extending from 300 to 3400 Hz, connected to converter 51, applies the filtered signal to the amplifier 8 connected to the loudspeaker 7 at the output of the reception channel.

In FIG. 2, the parallel and serial sample bit transmission modes are distinguished by barred and unbarred connections: a connection between two circuits which is barred by two oblique strokes indicates that the bits of the sample in question are transmitted in parallel on this connection, which comprises as many connecting wires as there are bits defining the sample; an unbarred connection between two circuits indicates that the bits of the sample in question are transmitted serially over this connection, which therefore comprises a single connecting wire.

For example, the encoded samples $X_e$ and $Y_a$, $X_a$ and $Y_e$ are obtained at the output of the encoder 20 in the form of eleven bits accompanied by a sign bit, and are transmitted in parallel form to the accumulator 34. The samples obtained at the output of the accumulator-subtractor 34 are in the form of eleven bits accompanied by a sign bit, and are transmitted in parallel form to the delay circuit 37. This accumulator 34 therefore has a parallel input and a parallel output, the recycling loop being a serial loop. These samples are stored in the delay line 25 in the form of eight bits accompanied by a sign bit, consisting of the most significant bits for each sample, loaded in parallel into the delay line. The recycling of the samples in the delay line 25 is obtained by parallel transmission of the nine bits at the parallel output to the parallel input of the delay line.

In the delay line 30, each of the coefficients $-C_e$ and $-C_a$ is stored in the form of nineteen bits accompanied by a sign bit. The ten most significant bits of coefficients $-C_e$ and $-C_a$, accompanied by the sign bit, are applied in parallel to the multiplier 40, along with the eight bits and the sign bit of the samples obtained at the parallel output of the delay line 25. The parallel-input multiplier 40 has a serial output, supplying the result of each multiplication in the form of eighteen bits accompanied by a sign bit. The twenty bits of each coefficient $-C_e$ and $-C_a$ are recycled in parallel. The adder 33 which adjusts the coefficients $-C_e$ and $-C_a$ receives the twenty bits of each coefficient to be adjusted in parallel and the nine most significant bits of the modulus of the sample obtained from the phase correction memory 43 and originating at the accumulator-subtractor 34, also in parallel. These nine bits, accompanied by a sign bit obtained from circuit 41, are added to the least significant bits of the coefficients $-C_e$ and $-C_a$ to be adjusted, so as to limit the control loop gain. The adder 33 has a parallel output, the corrected coefficients being supplied in the form of nineteen bits accompanied by a sign bit. This adder 33 therefore operates as a limited gain digital integrator.

In the accumulator 34, the recycling loop including adder 36 is of the serial type: the eighteen bits accompanied by the sign bit of each product formed in the multiplier 40 are added to the eighteen bits accompanied by a sign bit of the partial sum previously formed in the adder 36 and stored in the memory register 35, the eleven most significant bits of the sum obtained being supplied at the parallel output of the register 35.

Figure 3:
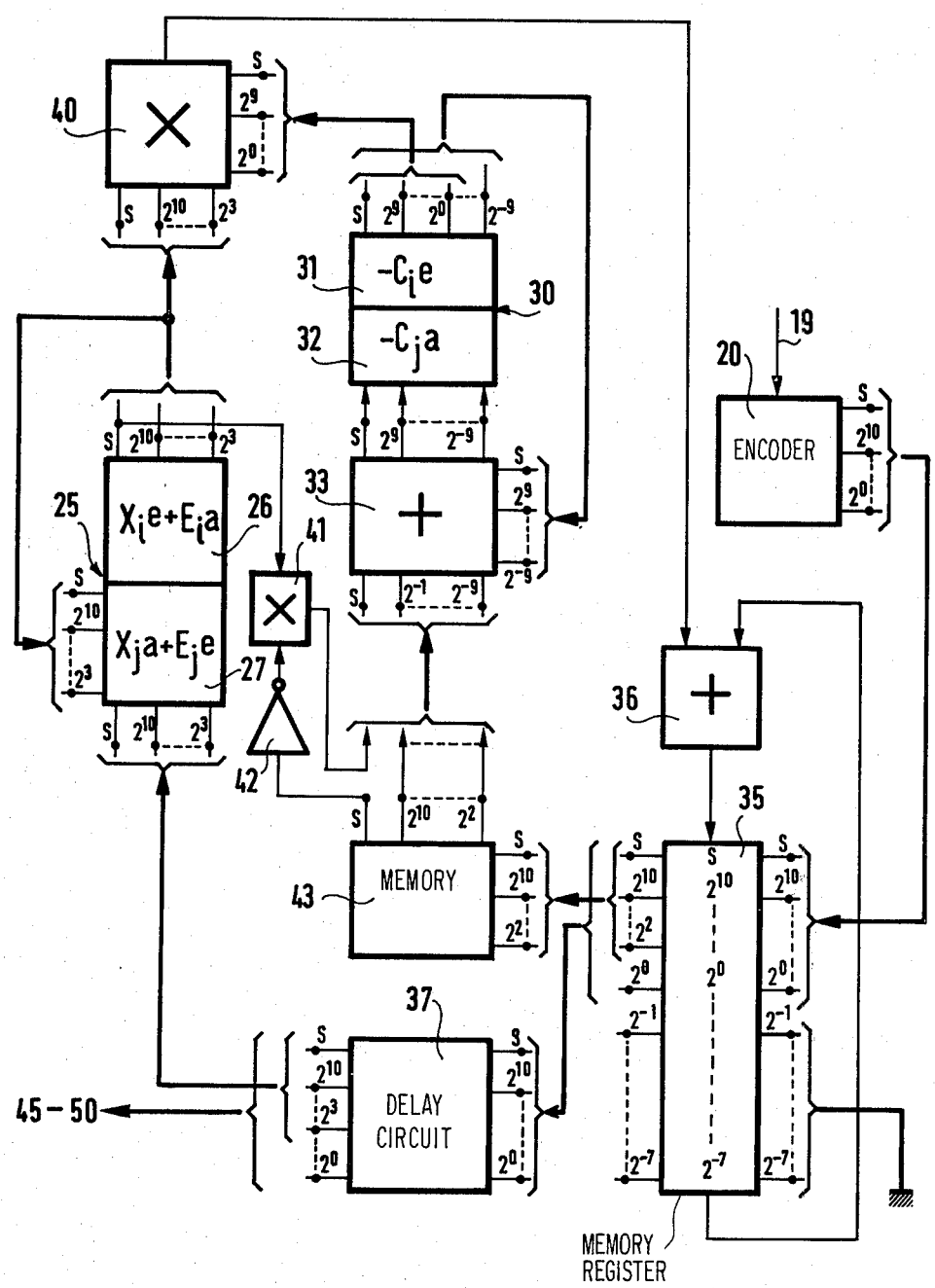
FIG. 3 shows part of the circuit of FIG. 2 in more detail.

This particular example is illustrated in FIG. 3, which shows the weights of the bits at the inputs and outputs of the various parts of the filter circuit and the accumulator-subtractor shown in FIG. 2 (the sign bit being indicated S). The reference weight $2°$ is that of the least significant bit of the encoded samples obtained from the encoder 20. To simplify the figure, the control signals to the various circuit elements have not been shown.

The example discussed hereinabove and concerned with the determination of the modulus of the correction $|\Delta C|$ consists in detecting the presence of a high-value sample at the output of the memory 43, for example by means of a logic gate detecting the presence of one or more bits among the most significant bits of this sample when a high value of the sample has been detected. A combinatory logic circuit gathers together the nine most significant bits of the modulus of the sample obtained from the memory 43 on a small number of bits (one, two or three bits), which are added in circuit 33 to the least significant bits of the coefficients $-C_e$ and $-C_a$.

The operation of the loudspeaking telephone shown in FIG. 2 will now be explained by explaining the processing carried out during each period T, where in this instance $T = 125$ μs.

The period T is divided into two cycles $T_e$ and $T_a$, the cycle $T_e$ being used for processing the electric echo loop signals and the cycle $T_a$ for processing the acoustic echo loop signals. The duration of cycle $T_e$ is $T.n/N$, so that $T_e = 45$ μs for $n = 46$ and $N = 128$.

The duration of cycle $T_a$ is $T.m/N$, so that $T_a = 80$ μs for $m = 82$ and $N = 128$. The multiplexer circuit is operated at the beginning of each cycle so that during cycle $T_e$ the encoder generates a sample $X_e + Y_a$ which is applied to the accumulator 34 at the start of the following cycle $T_a$ (for example, on the rising edge of this cycle $T_a$), whereas during cycle $T_a$ the encoder generates a sample $X_a + Y_e$ which is applied to the accumulator 34 at the start of the following cycle $T_e$ (for example, on the rising edge of the cycle $T_e$).

During cycle $T_e$, the accumulator 34 forms the sum of the received sample $X_a + Y_e$ and the convolution products $(X_{ie} + E_{ia}) \cdot (-C_{ie})$, where i varies from 1 to n, so that this sum is:

$$X_a + Y_e + \sum_{i=1}^{i=n} (X_{ie} + E_{ia})(-C_{ie})$$

as the value of $E_{ia}$ is very low, we obtain:

$$X_a + Y_e + (-\hat{Y}_e) \text{ i.e. } X_a + E_e.$$

This sample $X_a + E_e$ is then applied to the delay circuit 37 and to the memory 43, both being loaded at the end of cycle $T_e$ (or at the start of cycle $T_a$), whereas the corresponding sample delayed by NT in circuit 37 is transferred to the delay line 25 and to the register 50, both of which are loaded at the start of cycle $T_a$ (or at the end of cycle $T_e$). The register 50 transfers the sample $X_a + E_e$ to the converter 51, which applies the signal $x_a + \epsilon_e$ to the loudspeaker 7. During cycle $T_e$, the memory 43 supplies the adder 33 with the modulus of the sample $X_a + E_e$ obtained from the output of the accumulator of the end of cycle $T_e$ of the preceding period T, for adjusting the coefficients $-C_{ie}$.

During cycle $T_a$, the accumulator 34 forms the sum of the sample received at the start of this cycle $(X_e + Y_a)$ and the convolution products $(X_{ja} + E_{je}) \cdot (-C_{ja})$, where j varies from 1 to m. This sum is written:

$$X_e + Y_a + \sum_{j=1}^{j=m} (X_{ja} + E_{je}) \cdot (-C_{ja})$$

as the value of $E_{je}$ is very low, we obtain:
$X_e + Y_a + (-\hat{Y}_a)$ i.e. $X_e + E_a$.

The sample $X_e + E_a$ is then applied to the delay circuit 37 and to the memory 43, both of which are loaded at the end of cycle $T_a$ (or the beginning of cycle $T_e$), whereas the previously recorded sample delayed by NT is transmitted to the delay line 25 and to the register 45, both of which are loaded at the end of cycle $T_a$ (or the start of cycle $T_e$). The register 45 transfers this sample to the digital-analogue converter 46 which outputs the signal $\hat{x}_e + \epsilon_a$ to the transmission channel. The memory 43 delivers to the adder 33 the modulus of the sample $X_e + E_a$ obtained at the end of cycle $T_a$ of the preceding period T, for the adjustment of the coefficients $-C_{ja}$.

At the outputs of the transmission and reception channels, or rather sections 1'' and 2'' of these channels, the residual echo signals are of sufficiently low amplitude for the onset of oscillation to be inhibited, permitting normal use of the loudspeaking telephone.

The present invention has been described with reference to one embodiment. It will be obvious that details of this embodiment may be modified and/or certain means replaced by equivalent means without departing from the scope of the invention. Note in particular that the delay circuit 37 shown in FIG. 2 is equivalent to two delay circuits, each connected into one channel between the control signal takeoff point for one of the filters and the input signal takeoff point for the other filter, in FIG. 1. Each delay circuit then delays the input signal of the filter in question by a period at least equal to the active period of this filter.

We claim:

1. A loudspeaking telephone comprising:
    a differential coupler for connection to a two-wire telephone line and including an input and an output;
    a microphone circuit having its output connected to the input of a transmission channel whose output is connected to the input of the differential coupler;
    a loudspeaker circuit having its input connected to the output of a reception channel whose input is connected to the output of the differential coupler; and
    first and second adaptive transversal filter means associated respectively with the transmission channel and with the reception channel;
    both of the adaptive transversal filter means having controlled weighting and filter coefficients, and including:
    a signal combining circuit;

a transversal filter having a first signal input connected to receive the output signal of the associated signal combining circuit;

said transversal filter further having a second signal input connected to receive the output signal of the other channel; and a signal output connected to deliver a filter output signal to the signal combining circuit;

the signal combining circuit being connected in series with the other channel to receive the input signal of the other channel, to combine it with the filter output signal and to apply the combined signal to the remainder of the said other channel; and a control input for controlling the coefficients connected to receive the combined signal;

whereby said first adaptive transversal filter means uses the output signal of the reception channel to synthesise any acoustic echo signal component present in the output from the microphone circuit, and its combining circuit substracts the real and the synthetic acoustic echo signal components from each other to reduce the acoustic echo signal component in the transmission channel to a residual level; and likewise the second adaptive transversal filter means uses the output signal of the transmission channel to synthesise any electrical echo signal component present in the output from the differential coupler, and its combining circuit subtracts the real and the synthetic electrical echo signal components from each other to reduce the electrical echo signal component in the reception channel to a residual level.

2. A loudspeaking telephone according to claim 1, wherein the signal combining circuits are subtractor circuits.

3. A loudspeaking telephone according to claim 1 wherein the transmission and reception channels each comprise a respective delay circuit connected between the output of the signal combining circuit connected in series therein and the signal input of the other transversal filter, said delay circuit delaying the signal in the channel in question before its entry to the transversal filter signal input by a period at least equal to the active period of the impulse response synthesised by the transversal filter.

4. A loudspeaking telephone according to claim 1, wherein said first and second transversal filters are comprised of a single digital filter including first and second delay lines, the first delay line acting on the digitised values of the signal samples on the channels and having its input, constituting the signal input of the respective filter, connected to said channels via sampling and multiplexer circuits and an analogue digital converter, its output being connected to its input in order to recycle the stored samples, the second delay line acting on the weighting and filter coefficients and having its output looped to its input via a coefficient correction circuit receiving on an input constituting the control input of the respective filter the digitised values of the signals obtained at the outputs of the subtractor circuits, the telephone further comprising a two-input multiplier circuit connected to the outputs of the delay lines and summation means for summing the successive products computed by said multiplier circuit, the output of which constitutes the signal output of the filters and is connected to each of the signal combining circuits, the telephone further comprising a time sharing control unit controlling the operation of the single digital filter and defining, in each sampling period T relating to the sampling of the signals on the two channels, two successive timing cycles $T_e$ and $T_a$ for the synthesis of the transfer function of the electric echo path and the acoustic echo path.

5. A loudspeaking telephone according to claim 4, wherein said first and second delay lines are each divided into a first set of n stages and a second set of m stages, N, n and m being integers such that n+m=N, the n stages of said first delay line storing the digitised values of n samples of the transmission channel signal and being associated with the n stages of said second delay line which store n weighting and filter coefficients which represent n samples of the impulse response of the electrical echo path, for the computation of the n products thereof by said multiplier and the summation of said n products, the m stages of said first delay line storing the digitised values of m samples of the reception channel signal and being associated with the m stages of said second delay line storing m weighting and filter coefficients which represent m samples of the impulse response of the acoustic echo path, for the computation of the m products thereof by said multiplier and the summation of said m products.

6. A loudspeaking telephone according to claim 5, wherein the correction circuit (33) is comprised of an adder circuit operating as a limited loop gain integrator.

7. A loudspeaking telephone according to claim 4, wherein said second delay line is used to store weighting and filter coefficients representing samples of the impulse responses of the electric and acoustic echo paths, each with inverted phase, each of said signal combining circuits consisting of an accumulator circuit.

8. A loudspeaking telephone according to claim 7, wherein said subtractor circuits associated with each of said filters comprise a memory register with its input looped to its output via said summation means to form a single accumulator-subtractor circuit for both filters.

9. A loudspeaking telephone according to claim 8, further comprising a delay circuit connected to the output of said single accumulator-subtractor circuit, between a first signal takeoff point connected to said correction circuit to control the weighting and filter coefficients and a second signal takeoff point connected to the input of said first delay line, which introduces a delay at least equal to the greater of the two periods nT and mT.

10. A loudspeaking telephone according to claim 9, further comprising a memory connecting said first signal takeoff point to said correction circuit and introducing a shift of one cycle into the signal obtained at the output of said accumulator-subtractor circuit.

11. A loudspeaking telephone according to claim 4, further comprising a respective delay circuit connected in each of the transmission and reception channels between the output of the signal combining circuit associated with one of the transversal filters and the signal input of the other transversal filter, delaying the signal in the channel in question before its entry to the signal input of the transversal filter by a period at least equal to the active period of the impulse response synthesised by the transversal filter.

* * * * *